(No Model.)  2 Sheets—Sheet 1.
E. E. WHIPPLE.
HARROW.
No. 579,622.  Patented Mar. 30, 1897.
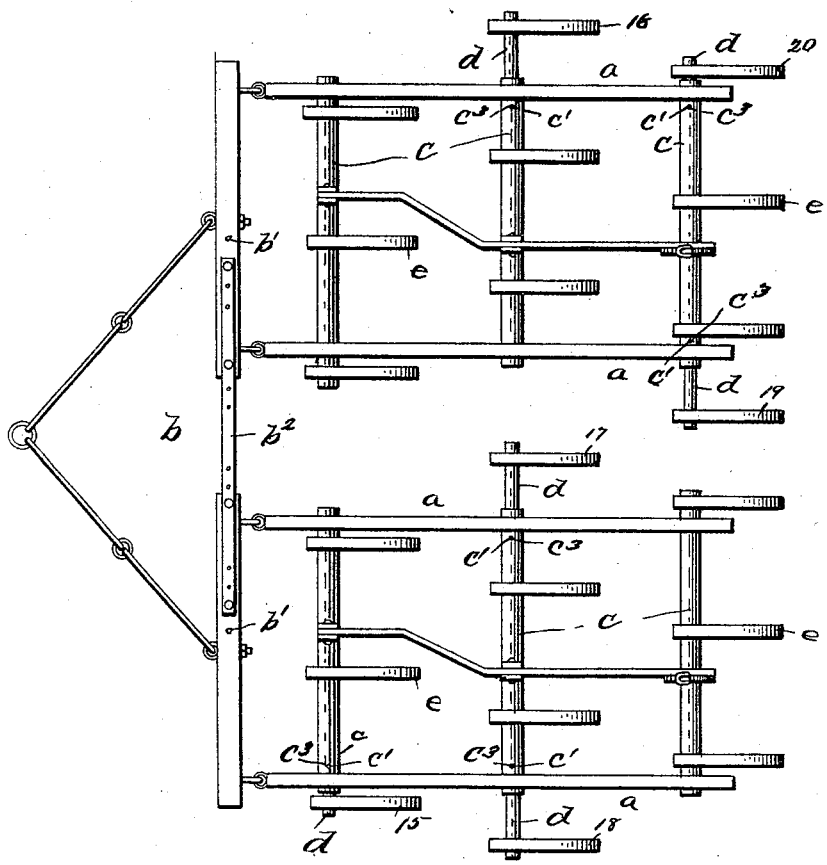
Fig. 1.
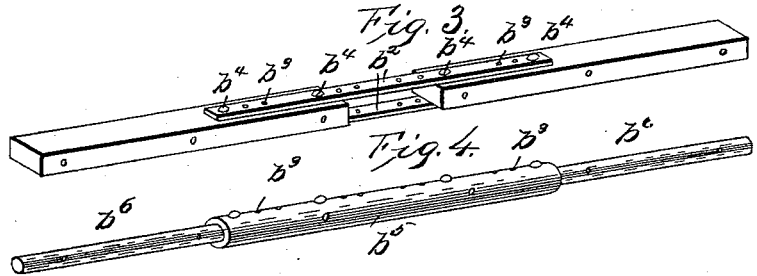
Fig. 3.
Fig. 4.
Witnesses  Inventor
E. E. Whipple
per O. E. Duff
Attorney (No Model.) 2 Sheets—Sheet 2.
E. E. WHIPPLE.
HARROW.
No. 579,622. Patented Mar. 30, 1897.
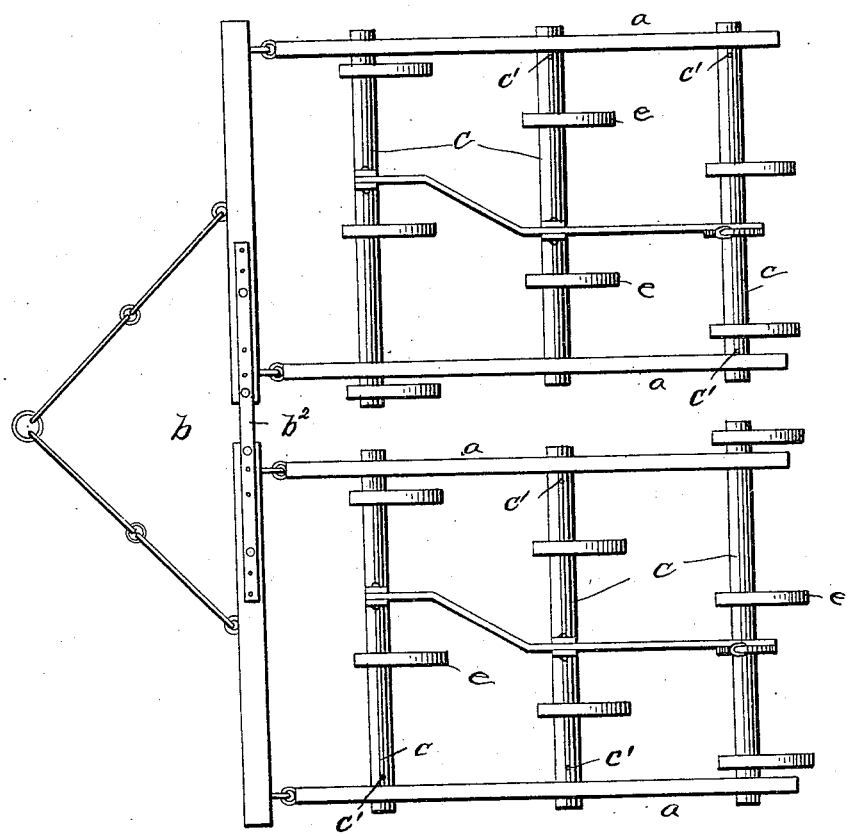
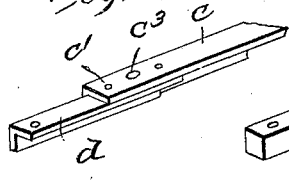
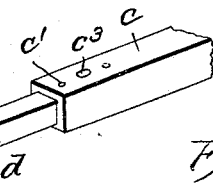
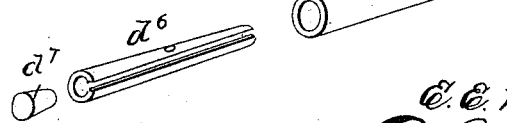
Witnesses
E. C. Allan Duffy
Hubert Beck
Inventor
E. E. Whipple
per J. E. Duff
Attorney

UNITED STATES PATENT OFFICE.

EFFINGER E. WHIPPLE, OF ST. JOHN'S, MICHIGAN.

HARROW.

SPECIFICATION forming part of Letters Patent No. 579,622, dated March 30, 1897.

Application filed July 23, 1895. Serial No. 556,858. (No model.)

*To all whom it may concern:*

Be it known that I, EFFINGER E. WHIPPLE, of St. John's, in the county of Clinton and State of Michigan, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in agricultural implements, and more particularly to improvements in harrows.

The object of the invention is to provide a harrow capable of comparatively quick and easy conversion into a tool of greater or less capacity as to number of teeth employed and surface thereby covered.

A further object of the invention is to provide an improved harrow which can be easily increased or diminished in capacity without changing the width of the frame proper by extending or reducing the length of all or certain of the rockable tooth-beams and the number of teeth carried thereby, and also properly adjusting the evener in relation to the harrow-section so varied, so that the harrow frames and beams can be originally constructed of the same size of a machine of the lowest capacity and can then be increased as desired.

The invention consists in certain novel features of construction and in combinations and arrangements of parts, more fully and particularly described and pointed out hereinafter.

Referring to the accompanying drawings, Figure 1 is a top plan view of a harrow having twenty teeth, being increased in capacity in accordance with my invention from a fourteen-tooth harrow, so that the capacity of the harrow can be varied from fourteen teeth to and including twenty teeth. Fig. 2 is a plan of the harrow reduced to fourteen teeth. Figs. 3 and 4 are detail perspective views of two forms of eveners. Figs. 5 and 6 are detail views of various forms of tooth-beam extensions that can be employed, showing the tooth-beam ends and fastening means. Fig. 7 is a detail perspective of a preferred form of extension and tooth-beam.

The harrow is here shown composed of two sections, each comprising two parallel frame-bars $a$ $a$, extending in the line of draft and loosely coupled at their front ends to the evener $b$, to which the draft is attached. This evener is longitudinally extensible in any suitable manner, so that the distance between the two harrow-sections can be increased or diminished as their capacity is varied.

The evener can be constructed in any desirable manner, as by two sections having series of bolt-holes $b'$ therein and the two plates $b^2$ on opposite sides of the two sections and provided with corresponding series of holes $b^3$, arranged to register with holes $b'$ and receive bolts $b^4$; also gas-pipe can be employed for this purpose, if desired, comprising the center large coupling-tube $b^5$, in which the two sections $b^6$ slide, so that the series of holes therein can register with holes in the coupling-tube to receive the securing-bolts.

$c$ are the rockable transverse tooth-beams, journaled in suitable bearings in the frame-bars, with their ends extending beyond the frame-bars and formed to receive extensions $d$, as hereinafter more fully specified.

$e$ are the curved spring harrow-teeth, suitably coupled to the tooth-beams.

The frame-bars of each section are arranged a fixed distance apart, and the tooth-beams thereof have the number of teeth of the smallest size of harrow secured thereto, here shown as seven in each section, so that a fourteen-tooth harrow would be the smallest size of the series shown.

The tooth-beams can be formed of any desirable shape in cross-section, as tubing, angle-iron, U-shaped iron, &c., with a series of bolt-holes $c'$ near the ends thereof, which are formed to receive the short extensions $d$, so that they will fit longitudinally in the ends of the tooth-beams. Each extension is provided with a spring harrow-tooth coupled thereon. In the case shown, where the harrow can be varied to any number of teeth between fourteen and twenty, inclusive, six extensions are provided carrying six teeth, (indicated by 15, 16, 17, 18, 19, and 20, respectively.) Each extension has a bolt-hole to register with one of the holes $c'$, so that the extension can be locked in the desired adjustment by one or more bolts $c^3$, thereby greatly increasing the strength of the tooth-beam to which the extension is secured. The tubular beam is preferably employed with a tubular longitudinally - split extension $d^6$, which can be locked in the beam by a transverse bolt and also expanded therein and locked by a plug $d^7$, driven in its end. (See Fig. 7.)

The smallest-size harrow is stripped of all extensions and the evener is adjusted to its shortest length to bring the harrow-sections the desired distance apart.

To make a fifteen-tooth harrow, the extension with tooth 15 is attached to the outer end of the front tooth-beam of the left-hand section, or the extension with tooth 20 is attached to the outer end of the rear beam of the right-hand section. The remaining extensions can be easily attached at the points indicated to increase the number of teeth until the harrow is of the capacity desired.

The evener is increased in length as extensions are attached at the inner ends of the tooth-beams.

What I claim is—

1. In combination, a two or more section float-harrow, each section comprising rigid frame-bars and a plurality of parallel tooth-bars carrying a plurality of teeth arranged to cover the ground, a plurality of tooth-bar extensions each carrying a tooth and arranged to be detachably secured to the ends of different tooth-bars beyond the frame with each extension-tooth properly spaced in relation to the fixed teeth and other extension-teeth to cover the ground, and at opposite sides of the sections to balance the harrow, and an evener-bar in front of and loosely coupled to all of the sections and to which the draft is attached, said evener-bar formed extensible to different lengths so as to increase or decrease the distance between the sections as the capacity of the harrow is increased or decreased by the addition or removal of extension-teeth, substantially as described.

2. In a float-harrow, the combination of two or more harrow-sections each formed of frame-bars and a series of parallel tooth-bars carrying the equally-spaced teeth arranged to cover the ground, an evener-bar arranged in front of all the sections and to which the front ends of the sections are loosely connected, said bar formed of sections coupled together in longitudinal adjustment so that the bar can be increased or diminished in length to vary the distance between the frames of the harrow-sections, and a plurality of detachable similar tooth-bar extensions, each formed of a straight bar provided with a harrow-tooth near one end, and each arranged to overlap a tooth-bar any desired distance with its tooth outside of and any desired distance from the frame so that the various extension-teeth are arranged on both sides of each section at various distances from the frame and consequently spaced equally with the fixed teeth and balancing the harrow, and means for detachably securing each extension-bar in the desired longitudinal adjustment to any tooth-bar, substantially as described.

In testimony that I claim the foregoing as my own I affix my signature in presence of two witnesses.

EFFINGER E. WHIPPLE.

Witnesses:
 JOSEPH M. RINGROSE,
 JNO. D. RINGROSE.